Jan. 23, 1962 M. PALMER 3,018,432
VOLTAGE REGULATOR
Filed June 17, 1959
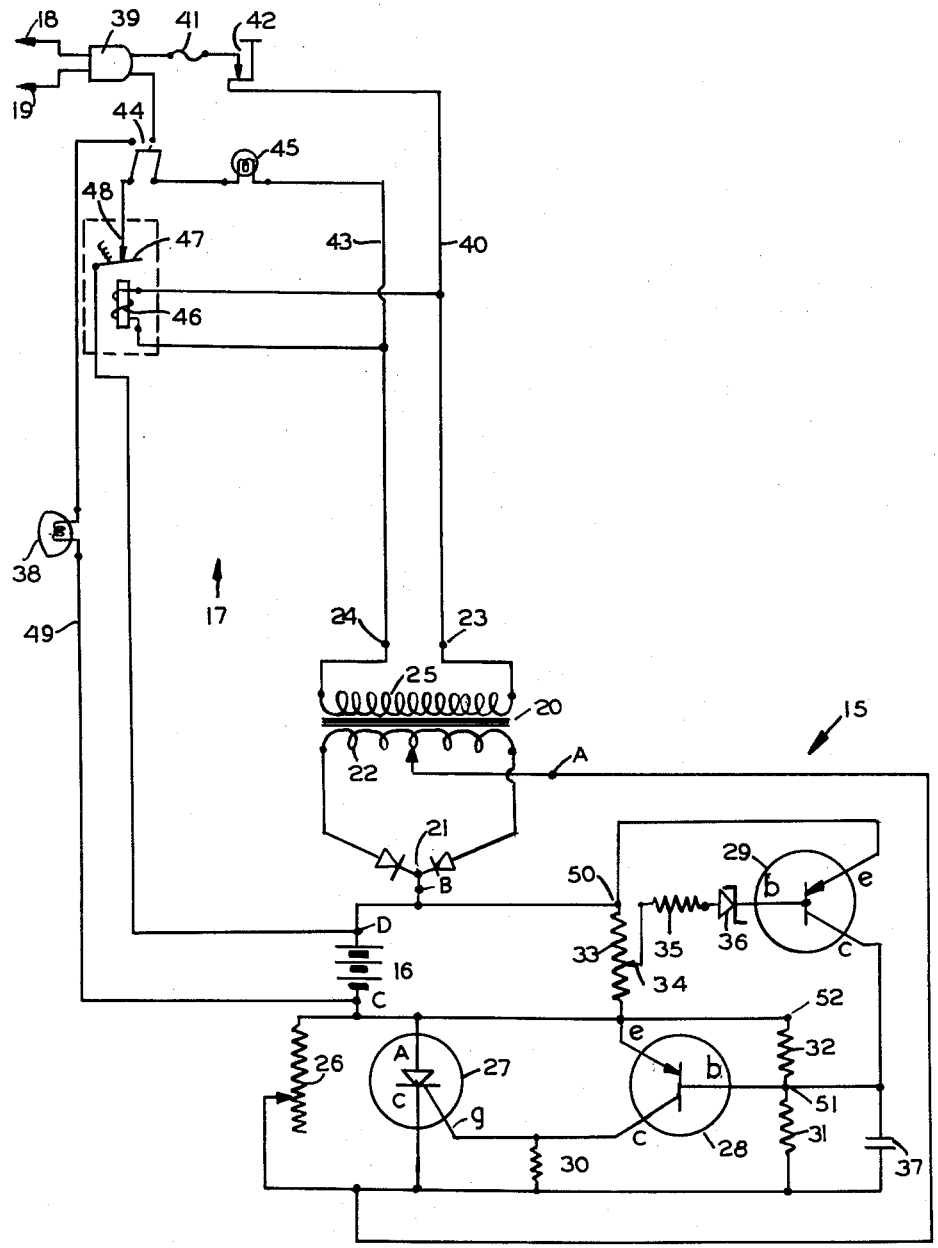
INVENTOR,
MAX PALMER,
BY
ATTORNEY.

United States Patent Office 3,018,432
Patented Jan. 23, 1962

3,018,432
VOLTAGE REGULATOR
Max Palmer, 12 Midwood Road, Rockville Centre, N.Y.
Filed June 17, 1959, Ser. No. 820,957
7 Claims. (Cl. 323—66)

The present invention relates to apparatus adaptable for charging an electric storage battery.

An object of this invention is to provide a novel and improved apparatus adaptable for charging a storage battery, using no electro-mechanical or relay devices to control the charging current when the battery has become fully charged, thus avoiding all arcing at contacts, their corrosion and the necessity of cleaning them from time to time, because in this new apparatus which is the subject of this invention, there are no make and break contacts as was incident heretofore in battery charging means.

Another object thereof is to provide a novel and improved battery charging apparatus which utilizes electronic means for automatically reducing the charging current to a trickle charge when the battery has come to full strength.

A further object of this invention is to provide a novel and improved battery charging apparatus of the character described, adapted for electrical systems in which the battery automatically operates electrical apparatus upon the failure of a current supply operating other electrical apparatus, as for instance in a system in which the storage battery automatically operates an auxiliary lighting system when the current in the main lighting system fails; the storage battery being charged by the main current supply which is automatically made to maintain it at the proper charge. With this new apparatus, using electronic means, the battery will be automatically recharged whenever it needs it.

Another object thereof is to provide a novel and improved electronically-controlled battery charging apparatus of the kind set forth, which is compact, occasions no chatter in operation, and practically needs no service once it has been adjusted and checked, and further it is one which is simple in construction, reasonably cheap to manufacture, reliable, and efficient in operation.

Other objects and advantages will become apparent as this disclosure proceeds.

For the practice of this invention, a circuit is provided which preferably includes a controlled silicon rectifier, whose gate excitation is controlled by a second transistor. There is a first transistor which conducts while the storage battery is fully charged and continues so to conduct until the battery charge falls to a predetermined level.

The arrangement is such, that while the first transistor conducts, the second transistor will not conduct. However, as soon as the battery charge falls to the mentioned level, the first transistor will stop conducting, whereupon the second transistor will conduct and hence will bring about gate excitation of the controlled rectifier. One terminal of the direct current charging source is connected to one terminal of the storage battery. An appreciable electrical resistance is connected in parallel with the controlled rectifier. One terminal of this parallel-connected group is connected to the other terminal of the battery, while the other terminal of said group is connected to the other terminal of the charging current supply. While the battery is being charged, the charging current supply will be maximum, because it will flow to the battery, through the controlled rectifier. When the battery is fully charged, said controlled rectifier will stop conducting, and but a trickle current will reach the battery through said appreciable resistance. The controlled rectifier and both transistors are here used merely as means to permit a uni-directional flow through them respectively. Resistances are included in the circuit to properly bias the transistors. Various of the resistances are of variable type to afford adjustment, which after once made, puts the apparatus in condition where thereafter it needs no further attention, because there is nothing to get out of order in normal usage.

The accompanying drawing which is part of this specification, shows a preferred circuit diagram of an electrical system including the teachings of this invention. It shows the new charging apparatus used in conjunction with an emergency lighting system. The charging current is taken from the main power lines. The battery automatically operates the emergency lighting means upon a failure of the main power lines.

In the drawing, the numeral 15 designates generally a preferred form of charging apparatus for the storage battery 16 which is here shown as the power supply for an emergency lighting system indicated generally by the numeral 17. A suitable supply of direct current need be applied across the points A and B for charging the storage battery. Where such battery-charging current supply is to be derived from the comparatively large voltage, alternating current, commercial power mains 18, 19, a step-down transformer 20 is used, having a rectifier means 21 in circuit with its secondary winding 22. The direct current supply thus obtained, is connected across such points A and B. The main lines 18, 19 are connected across the terminals 23, 24 of the transformer's primary winding 25. The terminals marked C, D across which the battery 16 is connected, are of course, the output terminals of the charging apparatus 15. The true input terminals of the charging apparatus, are A, B, because it will be readily understood to those versed in the art, that a direct current dynamo applied to the terminals A, B can be used to furnish the charging current supply, in which event the transformer 20 and its associated rectifier means 21 are omitted. This is easily comprehended without further illustration. It is most practical however, to use the set-up shown in the drawing, utilizing commercial power as the prime power source and including the required transformer 20 and the rectifier means 21 to get the proper charging current supply at the terminals A, B.

In the battery charging apparatus 15, there is a group consisting of a variable resistance 26 and a controlled silicon rectifier 27 which are connected in parallel. One terminal of this group is connected to terminal A and the other terminal of this group is connected to the terminal C. The terminals B and D are connected. It may here be noted, that upon excitation of the gate G of the controlled rectifier 27, which occurs when the transistor 28 conducts, the battery 16 will receive maximum charging current from the supply source existing at the terminals A, B, and when said transistor 28 is not conducting, the battery will receive but a trickle current, because current therethrough from the terminals A, B, will have to pass through the appreciable resistance 26. There also is a transistor 29 which conducts while the battery 16 is in its charged state above a predetermined level, and in so doing, prevents the transistor 28 from conducting. As soon however as the battery charge falls below such level, the transistor 29 stops conducting and thereupon the transistor 28 conducts. The electrical connections of all the components of the battery charger 15 will now be described.

The terminal A is connected to one terminal of the variable resistance 26, the cathode of the controlled rectifier 27, one terminal of a resistance 30 and to one terminal of the resistance 31. The gate $g$ of the controlled rectifier 27 and the collector $c$ of the transistor 28, are connected to the other terminal of the resistance 30. The base $b$ of the transistor 28, the other terminal of the resistance 31, one terminal of the resistance 32 and the collector c of the transistor 29, are connected. The terminal C is connected to the other terminal of the resistance 26, the anode of the controlled rectifier 27, the emitter e of the transistor 28, one terminal of the resistance element 33 and to the other terminal of the resistance 32. If desired, a condenser 37 may be connected across the resistance 31. The terminals D and B are connected to the other terminal of the resistance 33 and to the emitter e of the transistor 29. So that the resistance 33 may serve as an adjustable voltage divider, it has the variable tapping point 34. Interposed in series connection between and with said point 34 and the base b of the transistor 29, are the resistance 35 and the rectifier 36.

In this system, the controlled rectifier 27, the transistors 28, 29 and the rectifier 36, are here used merely as means to permit a uni-directional flow through them respectively. They are not called upon to act as rectifiers; the energy being supplied at the terminals A, B, being direct current.

As an example of values and identity of components of the system comprising the battery charging apparatus, the commercial mains supply 117 volt alternating current at 18, 19, which is fed to the primary winding 25 of the step-down transformer 20, whose secondary output is 12 volts, 10 amperes, which is rectified by device 21. The rectifier 36 is a Zener diode (650 c.) and the transistors 28, 29, are identified as of the 2N525 type. The controlled rectifier 27 is known by the number ZJ39L–25. The resistance 26 is 10 ohms, the resistance 30 is 5 ohms, the resistance 35 is 15 ohms, and each of the resistances 31 and 32 is 300 ohms. The resistance 33 is 200 ohms. The capacity of the storage battery 16 is six volts. The condenser 37 is 100 mf. 25 volts.

To aid the explanation of the automatic functioning of the battery-charging apparatus 15, as to how it maintains the battery 16 at proper charge, said apparatus is shown associated with an emergency lighting system 17 operated by the battery 16 upon failure in the main lines 18, 19 which operates a main lighting system, not shown. Such emergency lighting system will now be described.

In the emergency lighting system 17 shown, which is automatically operated by the storage battery 16 as the power source for the lamp 38, there is a plug 39 for connection to the main power lines 18, 19. In the electrical conductor 40 which connects terminal 23 to line 18, there is interposed the fuse 41 and a normally closed push button switch 42, in electrical series. In the electrical conductor 43 which connects terminal 24 to line 19, there is interposed one side of a double-pole single-throw switch 44 and a pilot lamp 45, in electrical series. The relay's electro-magnet 46 is connected across the terminals 23 and 24. The armature 47 of the relay is biased for normal contact with the contact point 48. Upon actuation of the magnet 46, the armature 47 will be attracted thereto and move away from the contact point 48. The armature 47 is connected to terminal D of the battery 16. One terminal of the other side of the switch 44 is connected to said contact point 48. The other terminal of said second half of said switch 44, is connected by a line 49 to the terminal C of the battery, in which line the emergency lamp 38 is interposed.

Let us consider the system with its components of the values stated heretofore and the battery 16 in charged condition. As long as there is a potential difference between the points 52 and 34 of approximately 2½ volts or more, the transistor 29 will conduct current from its collector c through its emitter e, creating a positive potential at point 52 with respect to point 51. This positive potential keeps the transistor 28 quiet, meaning non-conductive, and hence keeps a potential from developing at the gate g of the controlled rectifier 27. In this condition, the current to the battery 16 will be a mere trickle charge determined by the resistance 26 which maintains a rather small bias voltage across the controlled rectifier 27.

When the strength of the battery 16 is depleted to about one-half volt below full charge, this voltage differential is sufficient to keep current from flowing through the resistance 35 and the diode 36. Now there is a positive potential at point 51, which allows current to flow from the emitter e to the collector c of the transistor 28, which in turn creates a positive potential at g the gate of the controlled rectifier 27, making said rectifier 27 conductive, and thereupon the charging current from the terminals A, B which up to now reached the battery 16 as a mere trickle through the resistance 26, will now come to the battery full force by passing through 27, and the battery will receive the charging current at maximum value and become recharged. As soon as this occurs, the transistor 29 again becomes conductive and the transistor 28 and the controlled rectifier 27 will become non-conductive. In this manner, the battery 16 will always get charged when it needs it.

The battery 16 is thereby constantly maintained in charged condition for operation of the emergency lighting system or other electrical energy consuming device which may be in place of the lamp 38, upon a failure of the power in the main lines 18, 19. Said emergency system 17 operates as follows.

Upon closing the switch 44, the relay's electro-magnet 46 will be actuated and the contact between 47 and 48 will be broken. The circuit of the lamp 38 and the battery 16 will be open. The pilot light 45 will be lit, and thus show that the mains 18, 19 are supplying power. Should there occur a failure in the main supply of power, the relay's magnet 46 will become deactuated, the armature 47 will come into contact with point 48, and thereby the lamp 38 will be lit by power from the battery 16. While there is power in the mains 18, 19, and the switch 44 is closed, such power may be momentarily interrupted by opening the push button switch 42, to test if the emergency lamp 38 will be operated by the battery 16.

To read the appended claims on the embodiment shown in the drawing, the terminals C and D would be what the claims term the first and second output terminals respectively. The first transistor refers to 29 and the second to 28. The claim designations of first, second, third, fourth, fifth and sixth resistances, would refer in the drawing to the resistances, 26, 33, 32, 31, 30 and 35, respectively in that order. B and A are what the claims term the first and second terminals respectively of the current source. The numeral 16 indicates the load and the numeral 27 denotes the controlled electronic rectifier.

This invention is capable of various forms and numerous applications without departing from the essential features herein disclosed. It is therefore intended and desired that the embodiment and application thereof described herein be deemed illustrative and not restrictive and that the patent shall cover all patentable novelty herein set forth; reference being had to the following claims rather than to the specific description herein to indicate the scope of this invention.

I claim:

1. In a voltage regulator means for supplying current from a current source to a load device, a controlled electronic rectifier of the type having an anode and cathode and also a gate electrode, which latter when subjected to a predetermined electrical charge, makes said rectifier conductive so that current is allowed to flow from the anode to the cathode, two output terminals for connection respectively to the terminals of the load, a first resistance; the first ouput terminal being connected to said anode and to one terminal of said first resistance; the second output terminal being for connection to one terminal of the current source; said cathode being connected to the other terminal of said first resistance and adapted for connection to the other terminal of the current source, whereby when said controlled rectifier is nonconductive, said first resistance will allow only a trickle current to be available at said output terminals and when the gate electrode is excited, said controlled rectifier will allow substantially all of the energy from the current source to be available at said output terminals, first and second transistors, means actuated by the potential existing at said output terminals, making the first transistor conductive and holding the second transistor non-conductive while said potential is above a predetermined value, and making the first transistor non-conductive and making the second transistor conductive when said potential falls below said value and means including the second transistor for charging said gate electrode to make said controlled rectifier conductive when said second transistor is conductive; each of the transistors having a base, emitter and collector electrodes; the means for controlling the conductivity of said transistors comprising a second resistance having a tap intermediate its ends, third, fourth and fifth resistances and a diode rectifier; one terminal of the second resistance being connected to the second output terminal and to the emitter of the first transistor; the other terminal of the second resistance being connected to the emitter of the second transistor, one terminal of the third resistance to the anode of the controlled rectifier; said tap on the second resistance being connected to one terminal of the diode rectifier; the other terminal of said diode rectifier being connected to the base of the first transistor; said diode rectifier being arranged that the current is allowed to pass therethrough to the base of the first transistor; the collector of the first transistor, the base of the second transistor, the other terminal of the third resistance and one terminal of the fourth resistance being connected together; the collector of the second transistor, the gate of the controlled rectifier and one terminal of the fifth resistance being connected together and the other terminals of the fourth and fifth resistances and the cathode of the controlled rectifier being electrically connected together.

2. The apparatus as defined in claim 1, wherein the first resistance is variable.

3. The apparatus as defined in claim 1, wherein the tap is movable along the second resistance whereby the parts of such resistance between said tap and the ends of said second resistance, are variable.

4. The apparatus as defined in claim 3, wherein the first resistance is variable.

5. The apparatus as defined in claim 1, including a condenser connected across the fourth resistance.

6. The apparatus as defined in claim 5, including a sixth resistance connected in series with the diode rectifier.

7. The apparatus as defined in claim 1, including a sixth resistance connected in series with the diode rectifier.

References Cited in the file of this patent

UNITED STATES PATENTS

| | | |
|---|---|---|
| Re. 24,671 | Jensen | July 21, 1959 |
| 2,423,134 | Winkler | July 1, 1947 |
| 2,904,742 | Chase | Sept. 15, 1959 |